United States Patent [19]

McNally et al.

[11] Patent Number: 5,850,214

[45] Date of Patent: Dec. 15, 1998

[54] INFORMATION MANANGEMENT SYSTEM WITH ELECTRONIC CLIPBOARD

[75] Inventors: Keith R. McNally, Santa Clarita; Mark S. Knighton, Santa Monica, both of Calif.

[73] Assignee: Ameranth Technology Systems, Inc., Valencia, Calif.

[21] Appl. No.: 724,050

[22] Filed: Sep. 17, 1996

[51] Int. Cl.⁶ ................................................. G09G 5/00
[52] U.S. Cl. ........................................ 345/173; 178/18.11
[58] Field of Search ................................. 345/173, 168, 345/175, 176, 179, 180, 182, 183, 82, 83; 178/18, 19, 18.01, 18.03, 18.1, 18.11; 341/22, 23

[56] References Cited

U.S. PATENT DOCUMENTS

| | | | |
|---|---|---|---|
| 3,187,321 | 6/1965 | Kameny . | |
| 4,007,443 | 2/1977 | Bromberg et al. | 340/172.5 |
| 4,259,668 | 3/1981 | Nishimura et al. | 340/711 |
| 4,336,530 | 6/1982 | Koike et al. | 340/365 |
| 4,385,366 | 5/1983 | Housey, Jr. | 364/900 |
| 4,458,238 | 7/1984 | Learn | 340/365 |
| 4,853,888 | 8/1989 | Lata et al. | 364/900 |
| 4,880,969 | 11/1989 | Lawrie | 250/221 |
| 5,408,250 | 4/1995 | Bier | 345/169 |
| 5,424,729 | 6/1995 | Kishi et al. | 341/23 |
| 5,485,176 | 1/1996 | Ohara et al. | 345/173 |
| 5,508,720 | 4/1996 | DiSanto et al. | 345/169 |
| 5,508,911 | 4/1996 | Vanko et al. | 364/188 |
| 5,534,891 | 7/1996 | Takano | 345/169 |

*Primary Examiner*—Xiao Wu
*Attorney, Agent, or Firm*—Morgan & Finnegan, L.L.P.

[57] ABSTRACT

An information management system and method incorporates an electronic clipboard having a paper form integrated with projected lights as the user input and output interface, the electronic clipboard being adapted for inputting, processing, displaying, transmitting, receiving and outputting information through an innovative combination of simple, universally understood components, e.g., paper, clocks, pen, switches and lights. The electronic clipboard of the present invention is a unique form interface between user and computer for facilitation of extremely user-friendly remote data entry, information management and communication with a host computer, digital input device or remote pager. The electronic clipboard device comprises a large number of precisely located switches and lights beneath a display surface which project various colors, intensities, blinking frequency, etc., directly through the customized paper form by illuminating formatted paper forms placed firmly and precisely on the display surface. The lights transmit signals and status to an operator by displaying different colors as directed by software in a microprocessor in response to information entered manually by the operator or received from separate digital input devices and effectively convert a standard piece of paper into an 8.5 in.×11 in. display device.

23 Claims, 4 Drawing Sheets

| PARTY OF... | PAGER # | EST WAIT | VALET | BOOTH | PATIO | WINDOW | HI-CHAIR | SMOKING |
|---|---|---|---|---|---|---|---|---|
| ▷ WALLACE | | ▷ GALLAGHER | | ▷ SPELLING | | | ▷ | |
| ▷ OLSON | | ▷ CANNELLA | | ▶ DIMMESDALE | | | ▷ | |
| ▷ LOPEZ | | ▷ GELWICKS | | ▶ ELLIS | | | ▷ | |
| ▷ MATLOCK | | ▷ SHERIDAN | | ▶ JOHNSON | | | ▷ | |
| ▷ SHUMAN | | ▶ TYSON | | ▷ MENDEZ | | | ▷ | |
| ▷ GOODMAN | | ▷ KOPPEL | | ▷ TURNER | | | ▷ | |
| ▷ DWYER | | ▷ FAIRVIEW | | ▶ FARLEY | | | ▷ | |
| ▷ SARNOFF | | ▷ GILBERT | | ▶ HOUSEMAN | | | ▷ | |
| ▷ BAXTER | | ▷ SOUTHERN | | ▶ SULLIVAN | | | ▷ | |
| ▷ MARKHAM | | ▷ NAVARRO | | ▶ EDELMAN | | | ▷ | |
| ▷ STURGES | | ▶ GOLDBERG | | ▶ ISAACS | | | ▷ | |
| ▷ UNDERWOOD | | ▶ DILLER | | ▶ HELLMAN | | | ▷ | |
| ▷ PIKE | | ▷ GUTIERREZ | | ▶ MILSTEAD | | | ▷ | |
| ▷ HERNANDEZ | | ▷ PENN | | ▶ WONG | | | ▷ | |
| ▷ ROSENBERG | | ▶ EATON | | ▶ GENNARO | | | ▷ | |
| ▷ WESTON | | ▷ ELLIOT | | ▶ VELASQUEZ | | | ▷ | |
| ▷ KORITO | | ▷ HOLT | | ▶ WALKER | | | ▷ | |
| ▷ FLOURNOY | | ▷ SHEPHERD | | ▷ | | | ▷ | |
| ▷ ATKINSON | | ▷ LEARNER | | ▷ | | | ▷ | |
| ▷ BERGMAN | | ▷ DIETRICH | | ▷ | | | ▷ | |
| ▷ PARKER | | ▷ SMITH | | ▷ | | | ▷ | |
| ▷ WINSTON | | ▷ McNALLY | | ▷ | | | ▷ | |
| ▷ CAHILL | | ▷ GERSHWIN | | ▷ | | | ▷ | |
| ▷ KRAMER | | ▷ FAWKES | | ▷ | | | ▷ | |
| ▷ SEGAL | | ▷ KELLEY | | ▷ | | | ▷ | |
| ▷ HESSE | | ▷ THOMPSON | | ▷ | | | ▷ | |
| ▷ VOGT | | ▷ BAKER | | ▷ | | | ▷ | |
| ▷ SANDERS | | ▷ MAYFIELD | | ▷ | | | ▷ | |

FIG.4

INFORMATION MANANGEMENT SYSTEM WITH ELECTRONIC CLIPBOARD

FIELD OF THE INVENTION

This invention relates to an information management system and method incorporating an electronic clipboard having a paper form integrated with projected lights as the user input and output interface, the electronic clipboard being adapted for entry, management and communication of information for the operator as well as to and from another computer or remote digital device.

BACKGROUND OF THE INVENTION

Various forms of digital wireless communications devices are in wide use, e.g., digital wireless messengers and pagers. Also in common use are portable laptop and hand-held computers as well as personal digital assistant (PDA) devices. However, user friendly information management and communication capability not requiring computer expertise has not heretofore been available for use in everyday life such as for restaurant reservation and wait list management. Numerous companies in the computer industry have spent hundreds of millions of dollars on PDA development seeking to develop and produce a small, light weight and inexpensive device that could be adapted to such uses. For the most part, none of these devices have been broadly accepted and successful (e.g., Apple Newton®).

Wait lists and lines have been a frustration of man for centuries, if not longer. Despite the enormous advancements in computer and communications technology in the last few decades, most reservation and wait lists are still maintained by a single person with pen and paper because such a system works better than virtually all previous attempts to solve the problem with technology. While computers have dramatically altered many aspects of modern life, pen and paper have prevailed in the restaurant reservation and wait list management field because of their simplicity, ease of training and operational speed.

One of the inherent shortcomings of PDA type devices is that, as they strive for small size, low weight and low cost, they must compromise the size and clarity of the operator display medium interface itself, which in most cases is one of a variety of LCD (liquid crystal display) type devices. As the size of the display shrinks, the amount of information that may be displayed at any one point or time is commensurately decreased requiring multiple screens and displays to display information to the operator which reduces the overall utility of the device. Additionally, the smaller display and keyboard results in a non-optimal operator interface, which slows down operation and is thus unacceptable for the time criticality of reservation and wait list management and other similar applications. This necessitates many design compromises which in the aggregate have resulted in limited acceptance of PDA type devices.

In parallel with the many hardware attempts to produce an acceptable solution for replacing paper and pen lists, some systems incorporate a complex Windows® based software solution and a powerful PC type computer. This putative solution usually costs more than $5000, which is unaffordable for most reservation and wait list management applications and requires a dedicated operator to sit or stand behind a computer, which is untenable for most restaurant hosts, managers, etc. who must be mobile and free to update and maintain the wait lines and status as they move within their facility and interface with the customers. Additionally, the number of keystrokes and mouse button actions required for operation make these types of implementations marginal at best for the time criticality of reservation and wait list management and where computer expertise is not usually available.

For the foregoing reasons, paper lists have continued to outperform the best technology that industry could muster to replace them. Pen and paper have many inherent advantages that should be exploited and optimized rather than being replaced. Thus, the optimal solution will involve the integration of modern technology with the existing and powerful capability of pen and paper.

A principal object of the present invention is to provide an improved information management system which innovatively and uniquely combines the flexibility and ease of use of paper and pen with the processing power, memory and speed of a computer.

A further object of the present invention is to provide an improved information management system which is small, affordable and lightweight yet incorporates a large user-friendly operator interface.

A further object of the present invention is to provide an improved information management system which is capable of transmitting or receiving, directly from the operator interface, information to or from another computer or remote pager to update status information or convey paging or message signals directly through the paper form interface.

SUMMARY OF THE INVENTION

The foregoing and other objects of the present invention are provided by an information management system and method optimized for simplicity of operation which incorporates an electronic clipboard having a paper form with projected lights as the user input and output interface, the electronic clipboard being adapted for inputting, processing, displaying, transmitting, receiving and outputting information through an innovative combination of universally understood components, e.g., paper, clocks, switches and lights. The electronic clipboard of the present invention is a paper form-based interface between user and computer for facilitation of user-friendly remote data entry, management and communication with a host computer or remote pager. Forms other than paper may also be used so long as the material transmits projected light in conformance with the invention. This approach effectively converts a standard paper form into an 8.5 in.×11 in. operator "display".

In accordance with the present invention, an information management system comprises an electronic clipboard device having a large number of precisely located switches and lights situated beneath a transparent display surface. The lights project various colors, intensities, blinking frequency, etc., by illuminating formatted paper forms placed firmly and precisely on the display surface. This configuration builds on the speed and simplicity of paper input/output but greatly increases its functionality and utility with the addition of universally understood colors, e.g., green, amber and red, to symbolize actions, priority and status; the lights actually shine through the paper and effectively bring the paper to life and convert it into a large display device. This configuration thus combines the best features of paper, clocks, switches, pens, processors and software. The paper forms are customized to match the light pattern for an unlimited number of applications and thereby produce an effect equivalent to computer software merely by changing the paper form. Embedding a multiplicity of small colored lights in a precise pattern under a sheet of transparent material, overlaying a standard size piece of paper (with customized printing) on the transparent sheet, turning the lights on and off and varying their colors (e.g., red, green, amber) and thereby turning the paper into a large display device equivalent to a LCD display or computer monitor provides an extremely user-friendly system for information management and at a fraction of the cost of prior attempts to solve the above-enumerated problems. This approach works with and exploits the limitless array of paper sheets used throughout industry.

In one aspect of the present invention, when the invention is used as a restaurant reservation and wait list management system, reservations are recorded and maintained on customized paper forms attached to the clipboard and simultaneously input into the clipboard database. During peak periods, customers' arrivals and departures are recorded with the touch of a button. The host can instantly ascertain the status of all tables and customer seating preferences through monitoring the light status at the table button. If wait lists develop, the clipboard microprocessor of the invention automatically performs time management to relieve the host of this burden. Through easy to understand colored lights, the operator is alerted to the status of all waiting customers and available tables and, with a wireless pager device, customers can be automatically paged directly from the clipboard when their table is ready. The table status is updated automatically through remote wireless transmitters.

The limitations of existing hardwired or wireless communication and paging systems for wait list management, inventory, valet and other applications are resolved and technical advances are achieved in the present invention by a method and system for transmitting information to and from an electronic clipboard utilizing a paper form-based operator interface. The clipboard acts as a display device either for information received from a host computer or remote pager or to facilitate entry of information into the remote microprocessor for transmission to the host computer or remote pager. The clipboard facilitates the transmission of data from user to host computer or pager by allowing the user to write the information on a form which is pre-printed to correspond to software instructions contained within the clipboard microprocessor which turn the lights on and off and vary the colors. The user then enters the written information into the remote microprocessor contained within the clipboard by following written instructions at the top of the paper and responding to light signals generated by illuminating the switches directly above the printed blocks on the paper form. This is akin to function switches on a standard PC and makes possible limitless applications. No programming is required to change an application; only the ten graphical symbols at the top of the paper form. The data is then transmitted to the host computer or remote pager. Data from a host computer or remote pager is transmitted to the clipboard user by turning the lights on and off and varying the colors such that a particular paper form is illuminated in a manner that conveys unique and relevant application information to the user.

In yet another aspect of the present invention, the system and method of incorporating a paper form user interface for information management can be applied to an almost limitless array of situations. Once the unique marriage of lights, switches, paper etc. was conceptualized, the universality of the solution became self-evident in that while normal computer hardware solutions require different software applications and programming to adapt for new applications, the "software" of the present invention is the paper itself—change the paper form alone and the clipboard of the invention instantly becomes a waitlist, inventory list, ordering list, golf course status list, medical checklist, personal "to-do" list, etc.

BRIEF DESCRIPTION OF THE DRAWINGS

The foregoing features and advantages of the present invention can be appreciated more fully from the following description, with references to the accompanying drawings in which:

FIG. 4 shows a variation of the paper form shown in FIG. 1.

DETAILED DESCRIPTION OF THE INVENTION

Figure 1:
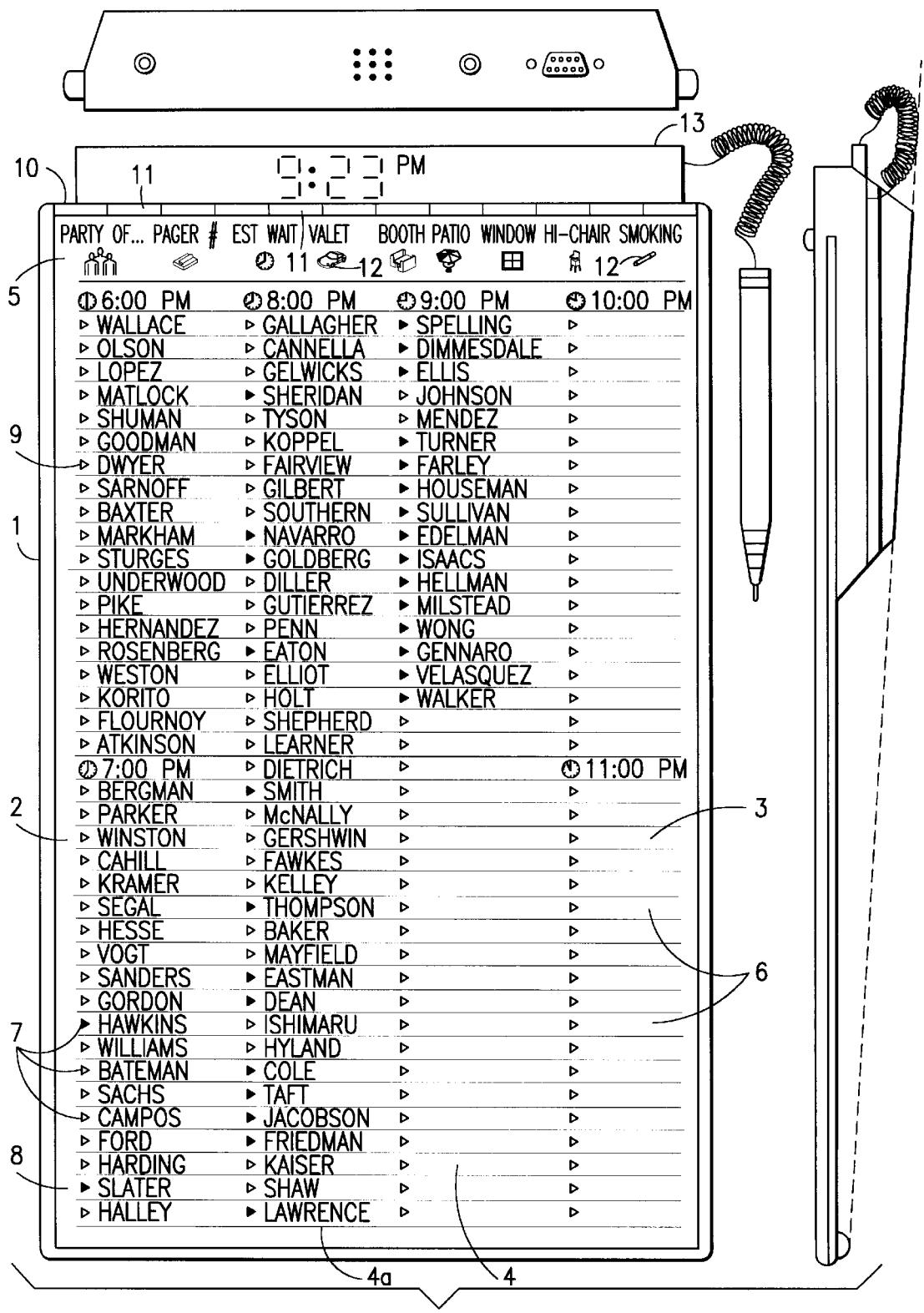
FIG. 1 shows a front, top and side view of an electronic clipboard in accordance with one embodiment of the information management system of the present invention showing a paper form specially printed for restaurant wait list management.
Figure 2:
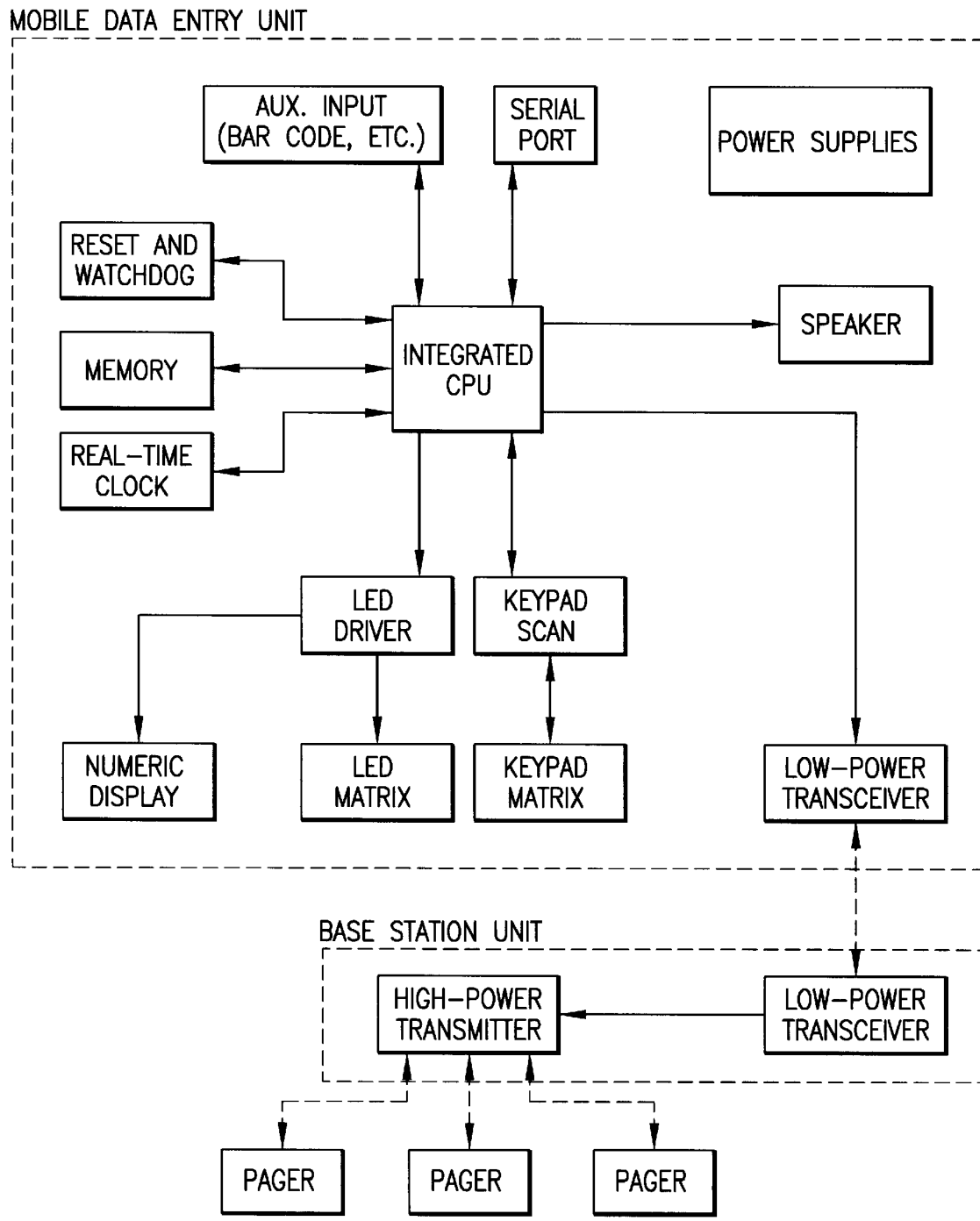
FIG. 2 is a block diagram showing the principal components of the embodiment of the invention shown in FIG. 1.

A preferred embodiment of an electronic clipboard in accordance with the information management system of the invention is shown in FIG. 1. The electronic clipboard 1 shown in FIG. 1 is approximately 10×12×1 inches in physical dimension and weighs approximately 1.5 lbs. FIG. 2 is a block diagram showing the principal components of the embodiment of the invention shown in FIG. 1 which also shows a base station unit for transmitting information to paging devices.

With reference to FIG. 1, the front 2 of the clipboard receives a standard 8.5×11 inch paper form sheet 3 backed with detachable glue and/or that resides within an area approximately 8.55×11.05×0.1 inches to enable firm positioning within the "clip" of the clipboard. The form is divided into an area for entry of written information 4 such as the names of guests 4a waiting to be seated and a function switch definition portion 5 at the top. Multiple forms are possible to access or reflect up to approximately 160 different type choices as depicted on the written information entry portion of the paper form in approximately 0.25×2 inch sections 6.

Figure 3:
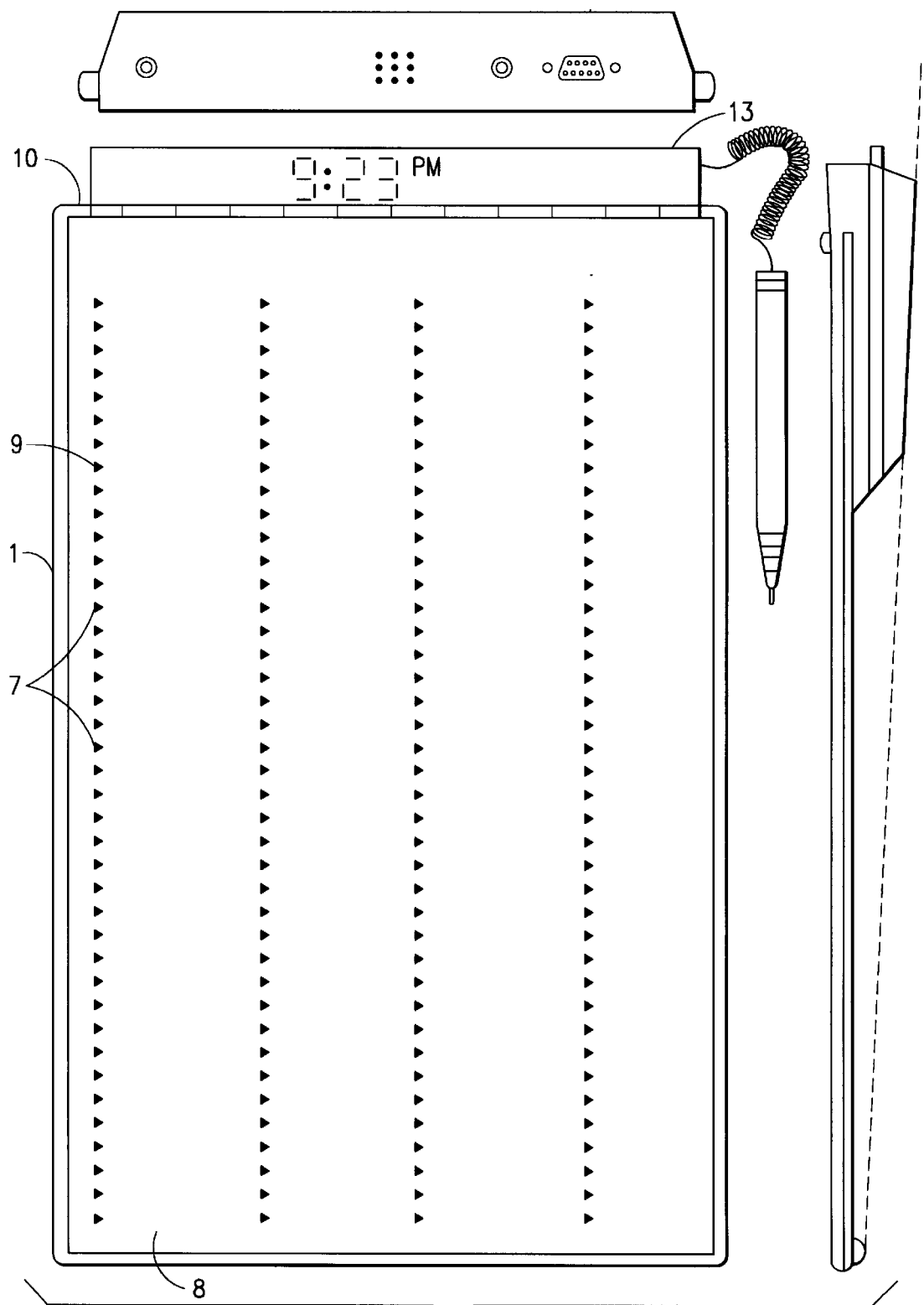
FIG. 3 shows the electronic clipboard of FIG. 1 with the paper form removed.

As shown in FIG. 3, approximately 160 lights 7 corresponding to the approximately 160 sections 6 are embedded beneath a transparent or translucent display surface 8 (e.g., clear plastic) directly below the paper. The sections 6 can be enlarged if desired simply by not using some of the 160 lights/switches, e.g., 80 lights/switches utilized would yield an area of 0.5×2 inch sections. The lights are sufficiently bright to be visible under ambient conditions. However, it should be appreciated by those skilled in the art that the invention contemplates use of lights that are visible in bright light surroundings. The lights display green, amber and red as the software in the microprocessor directs and also reflect appropriate status. At least one switch 9 is located in each of the 160 sections 6 to initiate a timing/clock process and/or to initiate a transmit function to either a beeper, host computer or a valet parking system over an internal radio. All data entries are recorded and stored and can also be displayed. A clock/timing function turns a green light to amber and red at the appropriate times based on initialization/set-up parameters. In this embodiment, the lights and switches are integrated into the same physical unit. However, in the more general case, the lights and switches are separate physical components. Moreover, in other embodiments the switches 9 may be placed directly behind the written information area of sections 6 rather than at the side as for the present embodiment, e.g., touch pads or recessed buttons.

The clipboard function switch area 10 at the top is adjacent the function switch definition portion 5 of the paper form 3. There are at least 12 function switches 11 in this embodiment and corresponding characters 12 printed on the form. The size of the characters is about one half inch square. The switches 11 also function as input keys for numerical data. The display 13 is readable at night and in ambient light conditions but not in bright sunlight. However, it should be appreciated by those skilled in the art that the invention contemplates use of display means which would be visible in such bright lighting conditions. Additional displays of characters, icons, lights etc. are included to reflect the status of certain activities, e.g., transmitting, power low, scanning, date/time etc.

The graphical symbols 12 at the top of the paper form correspond to the data entry switches 11 on the top of the clipboard. These switches are akin to the function keys on a standard computer keyboard. Changing the symbols on the appropriate form effectively reprograms the device without modifying the software. These symbols could be replaced with, e.g., F-1 through F-10 as with a standard keyboard, but with graphical symbols the operator thinks of the clipboard as a user friendly device that is easier to use than a computer. In other embodiments, these data entry switches 11 are placed directly behind the graphical symbols 12, e.g., touch pads or recessed buttons.

The function switches located directly above the paper permit custom applications. For instance, in restaurant wait list mode, a switch can be used for e.g., "size of table"—2, 4 or 8+. In this manner, the software/firmware requires a "match" at the entry of the appropriate parameter, e.g., if an operator is advised that a "table for 4" is now available he can touch that fixed switch, enter 4, and all matches, i.e., all parties waiting for a table for 4, will light up on the display.

FIG. 4 shows a variation of the above embodiment where the lower part 14 of the information entry portion 4 of the form 3 is used to display information regarding the status of particular tables as opposed to customers. It should be appreciated that many such variations are possible with regard to form layout and corresponding information entry and display. For example, one such embodiment uses all of the switches 9 and sections 6 for table management and monitoring.

With reference to FIG. 2, a simple point-to-point wireless capability is included which permits simple digital messages to be sent from the clipboard to a receiver in the beeper and/or valet parking base station. A simple protocol is used to acknowledge receipt of the message and thus simultaneous communication is not necessary, which reduces the cost of the wireless link. The range of the wireless link is determined by the characteristics of the radio transceiver. Adding a wireless link allows paging of beeper equipped customers directly from the operator interface on the clipboard and communication to and from various input/output transmitters and receivers to update the status of the lights on the clipboard and thus further reduce the workload on the operator and enable operations to proceed much faster. This link could also be hard wired or otherwise implemented using any two-way messaging transport.

Also with reference to FIG. 2, a scanning system can be included in the unit to, e.g., scan a beeper or valet parking slip and associate the scanned code with the appropriate section of the 160 sections to permit later transmission. The unit further includes a provision for holding a writing instrument, provision for desk mounting, the ability to exchange data to/from a PC and has battery recharge capability with battery life of at least 24 hours.

The above embodiment of the invention also has the capability to create a type of database. This is achieved by treating the 160 lights/sections and their associated time information, i.e., start, stop, unique fixed switch info, etc., as a kind of screen that is correlated to a particular paper form. This allows a single unit to maintain pertinent information on 5–10 different "sheets" in its database. For example, an operator may have different kinds of sheets, each of which has a unique database/file number. The operator places the appropriate sheet on the clipboard, enters the database file number, presses initialize—and the status of all of the 160 units and their associated data for the particular file number is shown by the lights. This simple database tool can reflect the status of an almost infinite number and variety of items—whether it be things, people, vehicles etc. This, combined with the ability to transmit the database in a wireless burst to a wireless receiver (which, e.g., interfaces via RS-232 type interface to a PC) creates a simple, inexpensive record keeping or inventory type tool which is adaptable to many other applications. Further, with an RS-232 type interface, the program/firmware can be updated or data exchanged with a PC without disassembling the unit.

Following is a step-by-step explanation of the operation of the above embodiment of the electronic clipboard of the present invention. This embodiment is configured for use in the restaurant wait list management, inventory, parking valet and "special" environments. Data input switches labeled R, I, V and S (or, alternatively, a single switch which may be toggled to different modes) at the top of the clipboard function as follows:

A. R=Restaurant

Step 1: Turn power on—clock and/or LED lights flash; install pre-printed restaurant wait list paper form on clipboard.

Step 2: Press R (Restaurant button)—LED lights come on and stay on.

Step 3: Press M (Memory button).

a. Enter "new" page number 01–99 or b. enter "old" page number 01–99.

c. If new page number is not in memory, clock displays all ones (11:11), the operator sets the correct time and restaurant operation is ready to start.

d. If old page number is selected, all data—light, time, date, quantity, etc.—from old page number is recalled, becomes active, and "continued" restaurant operation proceeds.

Step 4: Use existing customized forms or enter numbers between 01 and 160 on the form. These numbers represent tables as opposed to customers (see FIG. 4). These table numbers are treated differently than customer numbers; they represent the tables in the restaurant. For example, if there are 40 tables available, lights 121–160 will represent them while lights 1–120 remain dedicated to customer tracking.

If a light is green, the table corresponding to that light is available for seating. If the light is amber, the table is being cleaned and prepared and will soon be available. A red light indicates that the table is occupied. The lights are either updated manually by the operator to reflect a change in status or wireless transmitters communicate with the clipboard to update the table status.

In yet another variation, the software automatically turns a table light red when a customer is assigned to that table. When transmitters are included at the tables themselves, table availability can be updated automatically as well. If 00 is entered for table numbers, the clipboard will assume that the host prefers to monitor tables manually, i.e., on paper, and to use all 160 spot/paper lights for customers.

Step 5: Depressing one of the customer spot/paper switches turns the corresponding LED green on the clipboard and records the current time/date as "start time." The LED on "Size Of Party" and "Wait Time" flashes until the button is depressed and the desired number of minutes is entered, e.g. 01–99. After the wait time is entered, the "scan" light flashes and continues to flash until a 4-digit code on the beeper is entered by keyboard. The pager code representing the beeper code is then stored in the location number of the database which corresponds to the depressed customer spot/paper switch. It is also contemplated that the pager code could be entered by bar code scanning.

Step 6: The clipboard counts down until 5 minutes prior to "wait time" expiration and then turns the light from green to amber, signaling time to page the customer and alerting the host to initiate planning to seat the party. Any decision by the host to page early, i.e., prior to the promised seating time, is accomplished by depressing the customer spot/paper button again which immediately causes the green light to change to amber and the appropriate pager signalled. The light then changes to red if the customer does not report within 5 minutes or if the host has failed to seat the party. This indicates that the transaction is not yet complete and initiates an action to either page again or move another customer forward. Depressing the customer spot/paper button for 2 seconds, as opposed to the typical 0.5 seconds, purges the spot and turns the light off. The previous sequence is then repeated for multiple customers.

B. I=Inventory

Step 1: Turn unit on.

Step 2: Press I (Inventory button); light comes on and stays on: install appropriate sheet on clipboard.

Step 3: Depressing a spot/paper button turns the corresponding light green and records the current time/date in the memory slot; the clock flashes.

Step 4: Entering a number between 00-9999 representing a quantity followed by depressing the spot/paper button again records that quantity in the database location corresponding to the spot/paper location and turns the light off.

Step 5: The above sequence is repeated through 160 or the appropriate number on the sheet.

It is also contemplated that bar code scanning can be integrated into the inventory function. Further, when the inventory is complete, it may be stored as a page number for later recall or downloaded to PC via RS-232 interface. A further contemplated attribute is to have the capability to send in orders for fast food operations etc. via wireless link by depressing and holding a spot/paper button.

C. V=Valet

Step 1: Turn unit on.

Step 2: Press V (Valet button); insert appropriate sheet on clipboard.

The sequence is the same as for restaurant operation with the exception of an additional button. The additional button allows either scanning of a parking valet number or manual entry of a 4-digit number. The spot/paper buttons are also programmed to transmit that number to a base station. The base station device then automatically telephones the parking lot and instructs that the customer's car is to be made ready in a specified amount of time. Alternatively, the entire procedure could be automated with a direct wireless link such that depressing a spot/paper button signals the parking lot directly.

D. S=Special

Pressing the S button is followed by entering a program number (e.g., 01–09) which corresponds to special features included in custom software applications. The applicability is almost unlimited due to the unique characteristic of programming the unit through changing the paper form. Maintaining status of children in a day-care center, security access lists, timecards, inventories, to-do lists in which pre-set alarms warn of impending task deadlines by blinking and changing a light to yellow or red, appointment lists in doctors offices, check-in lists at airports to verify seating by touching the switch and turning a seat to green for occupied on a form preprinted to match the seating layout of the plane, maintaining wait lists for poker tables in casinos, golf courses etc. are just a few of the obvious applications.

While the best mode for carrying out a preferred embodiment of the invention has been illustrated and described in detail, those familiar with the art to which the invention relates will recognize various alternative designs and embodiments which fall within the spirit of practicing the invention. The appended claims are intended to cover all those changes and modifications falling within the true spirit and scope of the present invention.

That which is claimed is:

1. An information management system adapted for use with a preprinted form interface, said system comprising:
   (a) a transparent or translucent display surface adapted to receive a form containing printed blocks for entry of written information,
   (b) a multiplicity of lights positioned beneath said display surface for illuminating blocks printed on a form by projecting light through the form,
   (c) a first group of manual data input switches associated with said display surface, said switches being adapted for entry of data and instructions related to information written or printed on a form,
   (d) a second group of manual data input switches, at least one switch from said second group of switches being associated with at least one of said lights, said second group of switches being operative to enter data or instructions related to information written or printed on a form or in response to visual signals generated by said lights,
   (e) a data storage device for storing information and instructions entered through said data input switches,
   (f) a microprocessor, and
   (g) a timing device,
   wherein said microprocessor, timing device and data storage device are operative to cause said lights to generate visual signals by illuminating printed blocks on a form by projecting light through the form and thus converting the form into a display device in response to instructions programmed into said microprocessor and information and instructions entered through said data input switches.

2. An information management system in accordance with claim 1 wherein said system is adapted for use with a preprinted form interface which is erasable and reusable.

3. An information management system in accordance with claim 1 wherein said system is adapted for use with a preprinted paper form.

4. An information management system in accordance with claim 1 wherein each of said manual data input switches of said second group of switches is physically integrated with at least one of said lights.

5. An information management system in accordance with claim 1 further comprising means for transferring data or instructions between said system and another computer or remote digital device.

6. An information management system in accordance with claim 5 wherein said means for transferring data to or from said system is a wireless link.

7. An information management system in accordance with claim 1 further comprising a display device which displays information related to information conveyed by the light projected through the form, information written or printed on the form or data or instructions entered through the data input switches.

8. An information management system comprising:
   (a) a transparent or translucent display surface adapted to receive a paper form, said paper form containing printed blocks for entry of written information and being adapted to overlay and removably attach to said display surface,
   (b) a multiplicity of precisely located lights positioned beneath said display surface for illuminating said printed blocks on said paper form,
   (c) a first group of manual data input switches mounted adjacent to and coplanar with said display surface, said switches being adapted for entry of data and instructions related to information written or printed on said paper form,
   (d) a character display printed on said paper form adjacent said first group of manual data input switches, said character display indicating the functions of said switches for use with said form,
   (e) a second group of manual data input switches, at least one switch from said second group of switches being adjacent to and associated with at least one of said lights, said second group of switches being operative to enter data or instructions related to information written or printed on said paper form or in response to visual signals generated by said lights,
   (f) a data storage device for storing information and instructions entered through said data input switches,
   (g) a microprocessor, and
   (h) a timing device,
   wherein said microprocessor, timing device and data storage device are operative to cause said lights to generate visual signals by illuminating said printed blocks on said paper form by projecting light through the paper and thus converting the form into a display device in response to instructions programmed into said microprocessor and information and instructions entered through said data input switches.

9. An information management system in accordance with claim 8 wherein said character display overlays said first group of manual data input switches.

10. An information management system in accordance with claim 8 wherein each of said manual data input switches of said second group of switches is physically integrated with at least one of said lights.

11. An information management system in accordance with claim 8 further comprising means for transferring data or instructions between said system and another computer or remote digital device.

12. An information management system in accordance with claim 11 wherein said means for transferring data to or from said system is a wireless link.

13. An information management system in accordance with claim 8 wherein said lights are capable of emitting different colors and thereby producing color-based visual signals by illuminating said printed blocks on said paper form.

14. An information management system in accordance with claim 8 further comprising a display device which displays information related to information conveyed by the light projected through the form, information written or printed on the form or data or instructions entered through the data input switches.

15. A method for operating an information management system comprising the steps of:
   (a) entering written information on a form containing printed blocks for entry of said information, said form being removably attached to a transparent or translucent display surface,
   (b) entering data and instructions related to information written on said form through manual data input switches into a microprocessor or data storage device,
   (c) generating visual signals by illuminating said printed blocks on said form by projecting light through the form with a multiplicity of lights positioned beneath said display surface and thus converting the form into a display device in response to instructions programmed into said microprocessor, instructions generated by a timing device, messages from a remote device, data contained in said data storage device and data and instructions entered through said data input switches,
   (d) entering data or instructions through said manual data input switches in response to said visual signals generated by said lights.

16. A method for operating an information management system in accordance with claim 15 wherein said form for entry of written information is erasable and reusable.

17. A method for operating an information management system in accordance with claim 15 wherein said form for entry of written information is made of paper.

18. A method for operating an information management system in accordance with claim 15 further comprising the step of transferring data or instructions entered through said manual data input switches to another computer or remote digital device.

19. A method for operating an information management system in accordance with claim 18 wherein said data or instructions is transferred by a wireless link.

20. A method for operating an information management system in accordance with claim 15 wherein said form is removably attached to said display surface with detachable glue.

21. A method for operating an information management system in accordance with claim 15 wherein said form is removably attached to said display surface by a tightly coupled enclosure which is about 0.01 to 0.10 inch larger in width, height and thickness than said form.

22. A method for operating an information management system in accordance with claim 15 wherein said lights are capable of emitting different colors and thereby producing color-based visual signals by illuminating said printed blocks on said form.

23. A method for operating an information management system in accordance with claim 15 wherein information related to information conveyed by the light projected through the form, information written or printed on the form or data or instructions entered through the data input switches is displayed on a display device.

* * * * *